United States Patent [19]

Igarashi

[11] Patent Number: 5,359,716
[45] Date of Patent: Oct. 25, 1994

[54] METHOD OF AND SYSTEM FOR PROVIDING ACCESS TO BUS IN MULTI-PROCESSOR SYSTEM

[75] Inventor: Motomasa Igarashi, Sagamihara, Japan

[73] Assignee: Nitsuko Corporation, Kawasaki, Japan

[21] Appl. No.: 809,646

[22] Filed: Sep. 17, 1991

[30] Foreign Application Priority Data

Sep. 17, 1990 [JP] Japan .................................. 2-246420

[51] Int. Cl.$^5$ .................... G06F 13/368; G06F 13/37
[52] U.S. Cl. .............................. 395/325; 364/242.92; 364/DIG. 1; 364/937.01; 364/940.5; 364/DIG. 2
[58] Field of Search ............... 395/325, 200, 725; 364/242.92, 241.1, DIG. 1, 937.01, 94.05

[56] References Cited

U.S. PATENT DOCUMENTS 4,412,281 10/1983 Works ........................... 395/575
4,621,342 11/1986 Capizzi et al. .................. 395/325
5,073,871 12/1991 Uchida et al. .................. 395/425

*Primary Examiner*—Gopal C. Ray
*Assistant Examiner*—Glenn A. Auve
*Attorney, Agent, or Firm*—Keck, Mahin & Cate

[57] ABSTRACT

A system for securing a bus for a multi-processor system includes a plurality of processors connected in a closed loop so that each processor has a bus arbitration input signal output from the preceding processor and a bus arbitration output signal output to the following processor. The processor is judged to have the right to secure the bus when an exclusive logical sum of the bus arbitration input and output signals is a logical "1" and to have no right to secure the bus when the exclusive logical sum is a logical "0". The processor, when it is judged to have the right to secure the bus, reverses its bus arbitration output signal so as to abandon its own right to secure the bus and transfer the right to secure the bus to the following processor.

6 Claims, 3 Drawing Sheets

METHOD OF AND SYSTEM FOR PROVIDING ACCESS TO BUS IN MULTI-PROCESSOR SYSTEM

The present invention relates to a method of and a system for securing access to a bus in a multi-processor system without conflicts between processors.

BACKGROUND OF THE INVENTION

1. Field of the Invention

Conventionally, what is known as a "daisy chain" system is used, in a multi-processor system, to control or manage the order of priority of interruption demands or requests and/or use demands or requests on a system bus. Such a daisy chain type of multi-processor system includes a plurality of processors and has one input line and one output line provided for each processor for transmitting the requests to the respective processors. The output of each processor is connected to the input of the following processor.

2. Description of Related Art

A daisy chain type of multi-processor system includes a plurality of processors B1, B2, B3, ..., as is represented in FIG. 1, and typically manages or controls the order of priority in which access to a bus is acquired in such a way that if there are interruption requests raised simultaneously on a plurality of the processors, priority over other processors for bus acquisition is given to a processor closer to bus acknowledge (Bus ACK) in order to eliminate bus acquisition (Bus ACQ) conflicts among the processors. A daisy chain multi-processor system of this type has a functional disadvantage in that the processors having lower orders of priority of bus acquisition are very slow in acquiring access to the bus. Also, such a system has an architectural drawback in that the design of software for eliminating the occurrence of conflicting bus assignments is complicated.

SUMMARY OF THE INVENTION

It is a primary object of the present invention to provide a method of and system for assigning the right of access to a bus for processors of a multi-processor system so that no conflicts in bus acquisition occurs.

It is another object of the present invention to provide a method of and a system for assigning the right of access to a bus to processors of a multi-processor system which makes it easy to provide the multi-processor system with simple software and hardware.

These objects of the present invention are achieved by providing a method of and a system for assigning the right of access to a bus to a plurality of processors of a multi-processor system which are connected in a closed loop. Each processor has an input as a bus arbitration signal for the processor and an output as a bus arbitration signal for the following processor. Each processor finds an exclusive logical sun of its bus arbitration signals, input to and output from the processor. The processor is judged to have the right of bus acquisition when the exclusive logical sum is "1" and to have no right of bus acquisition when the exclusive logical sum is "0." After performing necessary processing over the bus, the processor having the right of bus acquisition reverses its bus arbitration signal output so as to abandon its own right of bus acquisition and transfers the right of bus acquisition to the following processor.

In a specific embodiment of the present system for assigning the right of bus acquisition to processors of a multi-processor system, each processor has means, such as an exclusive OR circuit, for providing an exclusive logical sum of the bus arbitration signals and means, such as a central processing unit, for judging the exclusive logical sum and reversing the bus arbitration signal output from the processor if the exclusive logical sum is "1".

The system further comprises reversing means, disposed between two adjacent processors, for reversing or inverting a bus arbitration signal input to the following processor of the adjacent two processors. The reversing means comprises an invertor or, alternatively, an extra processor, having an exclusive NOR circuit which functions as a combination of an exclusive OR circuit and an invertor.

According to the present invention, because only one of the processors is assigned the right of bus acquisition and the processor having the right of bus acquisition, after performing necessary processing for the bus, abandons its own right of bus acquisition and transfers the right of bus acquisition to the following processor, the software and hardware of the multi-processor system are simple.

BRIEF DESCRIPTION OF THE DRAWINGS

The above and other objects and features of the present invention will be apparent to those skilled in the art from the following description of preferred embodiments thereof when considered in conjunction with the accompanying drawings, in which similar reference numerals have been used to designate the same or similar elements throughout the drawings, and wherein.

DETAILED DESCRIPTION OF THE PREFERRED EMBODIMENTS

Figure 1:
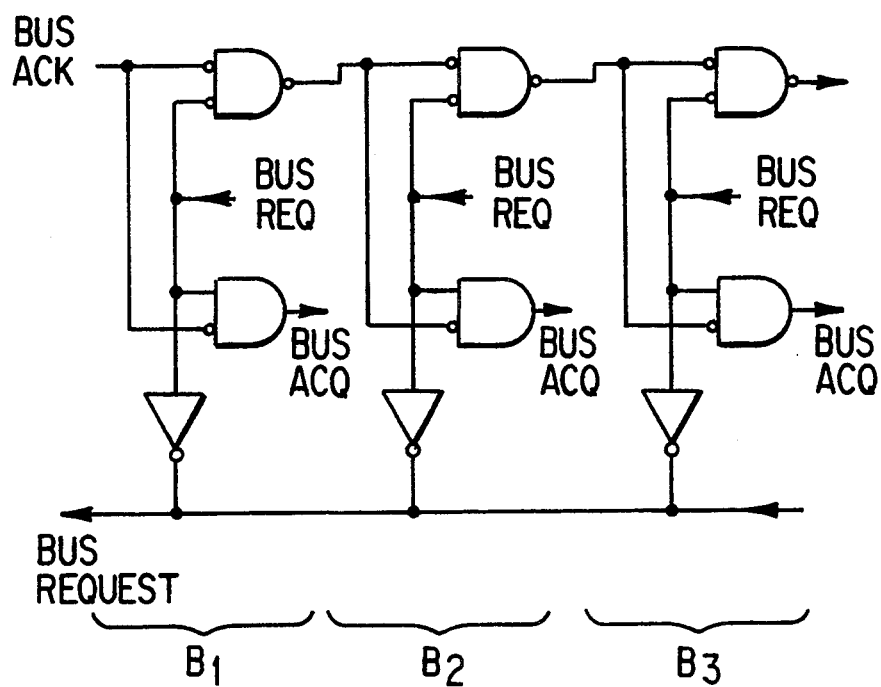
FIG. 1, as noted above, is a circuit diagram showing a prior art multi-processor system.
Figure 2:
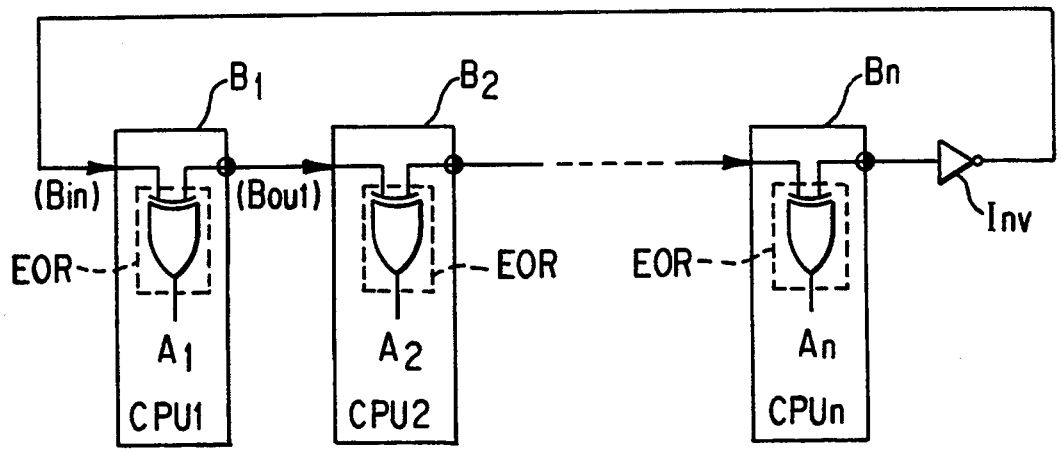
FIG. 2 is a circuit diagram showing a multi-processor system in accordance with a preferred embodiment of the present invention.

Referring to the drawings in detail and, in particular, to FIG. 2, a multi-processor system for the bus obtaining method in accordance with a preferred embodiment of the present invention is shown. The system includes a plurality of, namely, first to n-th processors B (i) (i=1, 2, 3, ..., n), each of which has an input terminal for a bus arbitration input signal (Bin) and an output terminal for a bus arbitration output signal (Bout). The output terminal of each processor B(i) is connected to the input terminal of the following processor B(i+1) so as to form a closed loop circuit of processors B1, B2, ..., Bn.

Each processor B(i) comprises a central processing unit CPU (i), including a microcomputer and an exclusive OR circuit EOR. The exclusive OR circuit EOR of each processor B(i) receives, as input, a bus arbitration input signal (Bin) output from the previous processor B(i−1) and a bus arbitration output signal (Bout) output to the following processor B(i+1), and provides an output A(i). The central processing unit CPU(i) of each processor B(i) judges the output A(i) of the processor B(i). The closed loop formed by the processors B1, B2, ..., Bn is provided with an invertor Inv between either adjoining processors B(i) and B(i+1) or, for example, as in this embodiment, the n-th and first processors B(n) and B(1).

It is to be noted that in the initial state, all the processors B(i) provide either logical "0" outputs or logical "1" outputs. The central processing unit CPU (i) of the processor B(i) determines its processor B(i) to have the right of bus acquisition (which will be referred to from now on as the "right of bus") when the logical sum or output A(i) of the exclusive OR circuit EOR of the processor B(i) is "1". Conversely, the central processing unit judges the processor to have no right of bus when the logical sum or output A(i) of the exclusive OR circuit EOR of the processor B(i) is "0". In the initial state, the exclusive OR circuit EOR, outputting a bus arbitration output signal (Bout) which is "1" indicating that the particular processor B(i) has the right of bus, is the exclusive OR circuit EOR of the first processor B(1) only. The exclusive OR circuits EOR of all the remaining processors, namely, the second to n-th processors B(2) to B(n), have outputs which are "0". This indicates that all the processors B(2) to B(n), other than the first processor B(1), have no right of bus. The provision of the exclusive logical sum A(i) is executed in a programmed routine for the processor.

The processor B(i) repeatedly verifies the right of bus and, if the right of bus is actually secured, reverses its bus arbitration output signal (Bout) after executing necessary processing over the bus. As a result of a reverse of the bus arbitration output signal (Bout), the processor B(i) abandons its own right of bus and simultaneously permits the right of bus to be transferred to the following processor B(i+1). The processor B(i+1), having now secured the right of bus, executes the same process as the previous processor B( i) . In such a way, the processors B(i) secure or transfer the right of bus from one to another.

Figure 3:
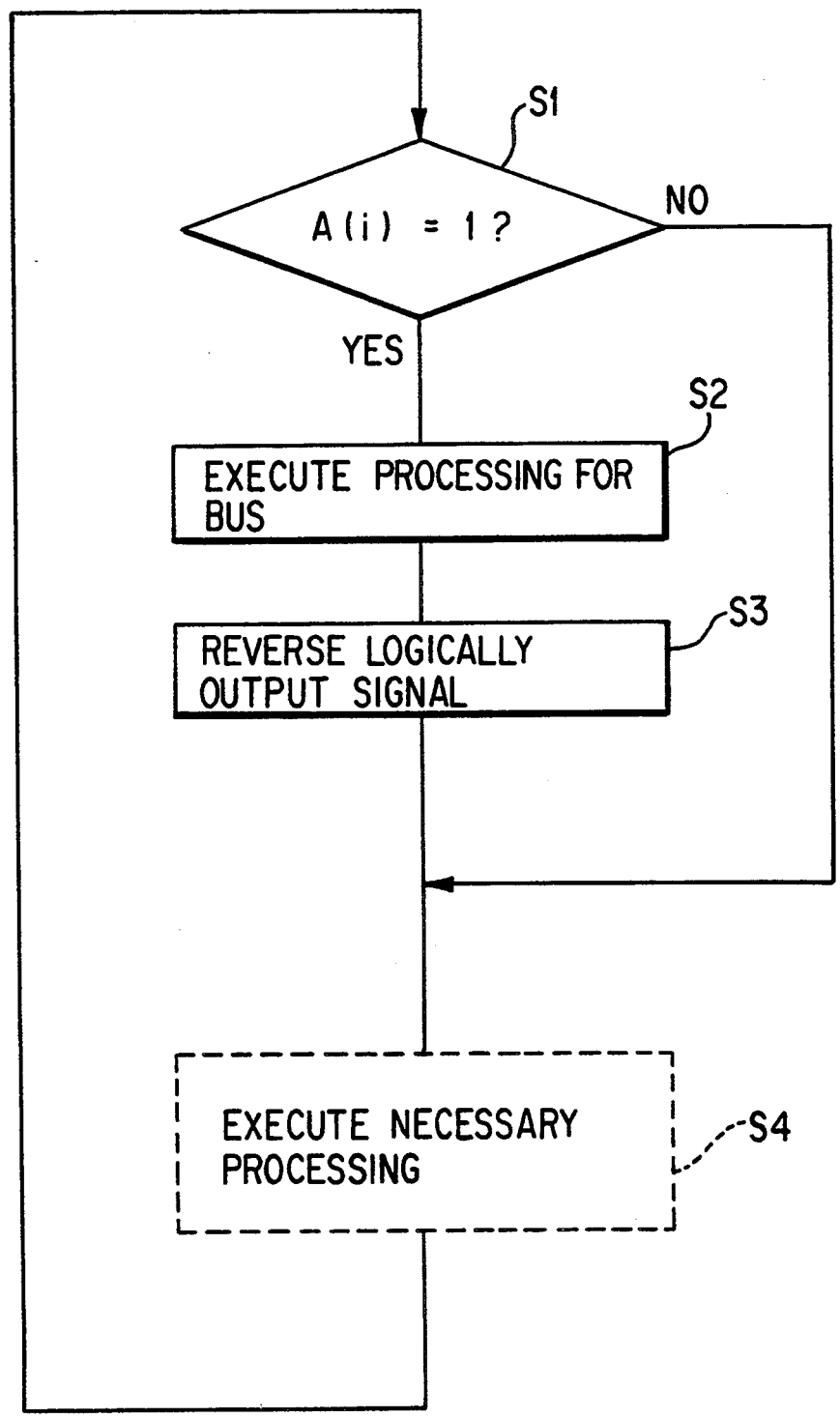
FIG. 3 is a flow chart illustrating a control sequence for a microcomputer included in the system of the present invention.

The operation of the multi-processor system depicted in FIG. 2 is best understood by reviewing FIG. 3, which is a flow chart illustrating a general routine for the microcomputer of the central processing unit CPU. Programming a computer is a skill well understood in the art. The following description is written to enable a programmer having ordinary skill in the art to prepare an appropriate program for the microcomputer of the central processing unit CPU. The particular details of any such program would, of course, depend upon the architecture of the particular computer selected.

Referring to the flow chart of the multi-processor control routine, the first step S1 is to make a decision as to whether the logical sum A(i) of the exclusive OR circuit EOR of the processor B(i) is "1". If the answer to the decision is yes, this indicates that the processor B(i) has the right of bus. Then, after executing the necessary processing over the bus at step S2, the processor B(i) reverses its bus arbitration output signal (Bout) at step S3. Thereafter, other necessary processing is executed at step S4. If the answer to the decision at step S1 is no, this indicates that the processor B(i) has no right of bus. After executing the other necessary processing at step S4, the multi-processor control routine is again executed.

According to the multi-processor system of the present invention, because it is not necessary to consider a conflict in securing a bus between the processors and all the processors are equal in position, the software and hardware of the multi-processor system are made simple. Furthermore, each processor easily decides that information has been transferred to all of the remaining processors, since the processor secures another right of bus after having transferred the right of bus to the following processor.

Figure 4:
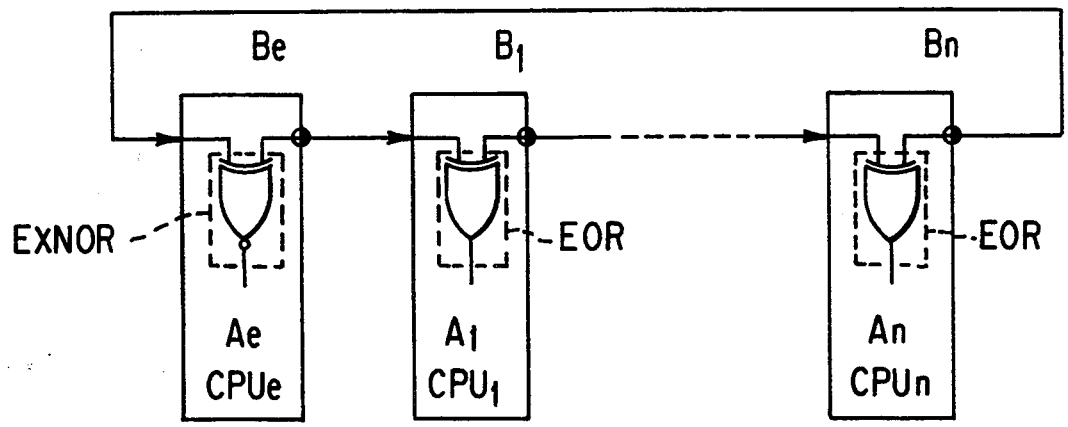
FIG. 4 is a circuit diagram showing a multi-processor system in accordance with another preferred embodiment of the present invention.

Referring to FIG. 4, a multi processor system in accordance with another preferred embodiment of the present invention is shown. This embodiment includes an exclusive NOR circuit EXNOR, but has no invertor, such as the one provided in the multi-processor system shown in FIG. 2.

The multi-processor system of this embodiment comprises first to n-th processors Bi (i=1, 2, 3, ..., n), each of which has an input terminal for a bus arbitration input signal (Bin) and an output terminal for a bus arbitration output signal (Bout). The output terminal of each processor B(i) is connected to the input terminal of the following processor B(i+1) so as to form a closed loop circuit of processors B1, B2, ..., Bn. The multi processor system is basically identical in operation to the previous embodiment. However, the invertor Inv and one of the processors after the invertor Inv, namely, the processor B(1) of the previous multi processor system shown in FIG. 2, has been replaced by an exclusive NOR circuit.

The extra processor (Be) is connected between two adjacent processors B ( i ), which may, for instance, be the processors (Bn) and (B1), in the same way as the other processors. The extra processor (Be) receives, as input, a bus arbitration signal, output from the preceding processor (Bn), and outputs a bus arbitration input signal to the following processor (B1). The extra processor (Be) comprises an exclusive NOR circuit EXNOR for providing a reversed output of an exclusive logical sum of bus arbitration signals input to and output from the extra processor Be, and a central processing unit CPUe, which is the same in operation and structure as the central processing unit CPU(i) of the other processors B(i). The central processing unit CPUe determines that the extra processor has a right of bus when the exclusive logical sum Ae of the extra processor Be is "0" and has no right of bus when the exclusive logical sum of the extra processor Be is "1". The central processing unit CPUe reverses the bus arbitration signal output from the extra processor (Be) when the extra processor Be has the right of bus so that the extra processor (Be) abandons the right of bus and transfers the right of bus to the following processor B1.

It is to be understood that although the present invention has been described with respect to preferred embodiments thereof, various other embodiments and variants, which fall within the scope and spirit of the invention, are possible. Such other embodiments and variants are intended to be covered by the following claims.

What is claimed is:

1. A method of securing a bus for a multi-processor system, said system comprising a plurality of processors connected in a closed loop, each of said processors having an input terminal used to input a bus arbitration signal output from a preceding processor and an output terminal used to output a bus arbitration signal to a following processor, said method comprising the steps of:

finding an exclusive logical sum of bus arbitration signals input to and output form one of said processors;

judging said one of said processors only to have aright to secure said bus when said exclusive logical sum of bus arbitration signals input to and output form said one of said processors is "1" and judging said one of said processors to have no right to secure said bus when said exclusive logical sum is "0";

causing said one of said processors, when it is judged to have the right to secure said bus, to execute necessary processing over said bus; and reversing said bus arbitration signal form said one of said processors, after said necessary processing has been executed and when it is judged to have the right to secure said bus, so that said one of said processors having the right to secure said bus abandons its own right to secure said bus and transfers the right to secure said bus to a following processor.

2. A system for securing a bus in a multi-processor system, said system for securing a bus comprising:

a plurality of processors connected in a closed loop so that each of said processors receives a bus arbitration output signal, output from a preceding processor, and outputs a bus arbitration input signal to a following processor, each of said processors having logical means for providing an exclusive logical sum of bus arbitration signals input thereto and output therefrom, and processing means for (a) judging one of said processors only to have a right to secure said bus when its exclusive logical sum is "1" and judging said one of said processors to have no right to secure said bus when its exclusive logical sum is "0" and (b) reversing the bus arbitration input signal output to a following processor after processing over said bus is executed so that the right to secure said bus is abandoned and transferred to the following processor; and reversing means disposed between adjacent processors of said plurality of processors for reversing a bus arbitration output signal output from a proceeding one of said adjacent processors.

3. A system as recited in claim 2, wherein said processing means comprises an exclusive OR circuit.

4. A system as recited in claim 2, wherein said reversing means comprises an invertor.

5. A system as recited in claim 2, wherein said reversing means comprises an extra processor connected between the adjacent processors so that said extra processor receives a bus arbitration output signal, output from the preceding processor of said adjacent processors, and outputs a bus arbitration input signal to a following processor of said adjacent processors, said extra processor having logical means for providing a reversed output of an exclusive logical sum of bus arbitration signals input to and output from said extra processor, and processing means for judging said extra processor to have a right to secure said bus when said exclusive logical sum of said extra processor is "0" and to have no right to secure said bus when said exclusive logical sum of said extra processor is "1" and for reversing said bus arbitration input signal, output from said extra processor, when said extra processor has the right to secure said bus so that said extra processor abandons the right to secure said bus and transfers the right to secure said bus to the following processor of said adjacent processors.

6. A system as recited in claim 2, wherein said processing means comprises an exclusive NOR circuit.

* * * * *